United States Patent [19]

Malavasi

[11] 4,222,043
[45] Sep. 9, 1980

[54] PORTABLE SELF-CONTAINED SECURITY SYSTEM

[76] Inventor: Stuart H. Malavasi, 3281 Valley Rd., West Millington, N.J. 07946

[21] Appl. No.: 919,498

[22] Filed: Jun. 27, 1978

[51] Int. Cl.² .................. G08B 13/14; G08B 13/08
[52] U.S. Cl. .................. 340/568; 307/10 AT; 340/63; 340/652
[58] Field of Search ............ 340/568, 545, 541, 63, 340/652, 654; 307/10 AT

[56] References Cited
U.S. PATENT DOCUMENTS

| 3,742,480 | 6/1973 | Hoecker | 340/568 |
| 3,765,008 | 10/1973 | Lowry | 340/652 |
| 3,783,340 | 1/1974 | Becker | 340/652 |
| 3,878,507 | 4/1975 | Medlock | 340/568 |
| 4,034,337 | 7/1977 | Haddock | 340/63 |

Primary Examiner—Glen R. Swann, III
Attorney, Agent, or Firm—Anthony F. Cuoco

[57] ABSTRACT

A solid state, portable, self-contained security system for indicating unlawful entry and/or loss of valuable articles includes circuitry having current flow control means normally in an "off" state and set to be rendered in an "on" state when security has been broken, whereupon an alarm is provided. The alarm continues until the current flow control means is reset. The circuitry operates in a sensorless mode whereby the alarm is provided when the external connections to the circuit are disturbed, and in a sensor mode whereby the actuation of external sensors connected to the circuitry provides the alarm.

6 Claims, 2 Drawing Figures

PORTABLE SELF-CONTAINED SECURITY SYSTEM

BACKGROUND OF THE INVENTION

1. Field of the Invention

This invention relates generally to security systems and particularly to portable self-contained security systems. More particularly, this invention relates to a security system of the type described which has universal application and may be used with or without sensors so as to provide a versatility heretofore unknown in the art.

2. Description of the Prior Art

Modern society has found it necessary to provide security systems for personal as well as property protection. As an example, valuable property that is now installed in automobiles, boats and other like vehicles must be protected against intruders, as must be the home which requires personal as well as property protection. Security systems heretofore known in the art are of the "burglar alarm" type requiring expensive and costly installation. Moreover, these prior art systems must be operated from a central control center and are easily overridden by an intruder. A need exists for a portable self-contained security system having its own control center and designed to avoid the aforenoted overriding. Moreover, the need exists for a system of the type described which may be used in mobile equipment such as an automotive vehicle or the like, as well as in the home or, indeed, in conjunction with any article, piece of equipment, building or the like for which security protection is required. Further, it is desirable that these systems be versatile so as to be operative without external sensors, but yet have the capability of operating in a sensor mode. The security system of the invention combines the aforenoted attributes into a simple, economical device which features ease in manufacturing and use. Accordingly, the device of the invention is of the type generally described in a brochure entitled "Home Security Alarms" published by the National Bureau of Standards, U.S. Department of Commerce, LC1079, March, 1977. These security devices are defined as having detectors or sensors, control units and an actual alarm. The particular device of the present invention satisfies the criteria outlined in the referenced brochure.

SUMMARY OF THE INVENTION

This invention contemplates a security device of the type described including a circuit having first and second current flow control devices normally in an "off" state and voltage divider means. The voltage divider means provides a voltage for maintaining the first current flow device in an "off" state until the circuit is distrubed whereupon the first current flow control device is rendered in an "on" state and develops a pulse. The pulse renders the second current flow device in an "on" state whereupon an alarm is provided for indicating that the circuit has been disturbed. The alarm continues to sound until the circuit is returned to its undisturbed state i.e. all faults removed, and the second current flow control device is reset via a reset switch. The circuit as described may operate in a sensorless mode whereby the circuit is disturbed by disturbing its external connections, or may operate in response to external sensors the actuation of which will disturb the circuit.

The main object of this invention is to provide a versatile, portable, self-contained universally applicable device for indicating that security has been broken.

Another object of this invention is to provide a device of the type described including circuit means, and which indicates that security has been broken when the circuit means is disturbed from a no-fault state.

Another object of this invention is to operate the device in a sensorless mode whereby the circuit is disturbed by disturbing its external connections for indicating that security has been broken.

Another object of this invention is to operate the device in response to external sensors, the actuation of which will disturb the circuit for indicating that security has been broken.

Another object of this invention is to provide a device of the type described which is simple in construction and features ease in manufacture and use.

These and other objects and features of the invention are pointed out in the description which follows in terms of the embodiments thereof as shown in the accompanying drawings. It is to be understood, however, that the drawings are for the purpose of illustration and are not a definition of the limits of the invention, reference being had to the appended claims for this purpose.

DESCRIPTION OF THE INVENTION

Figure 1:
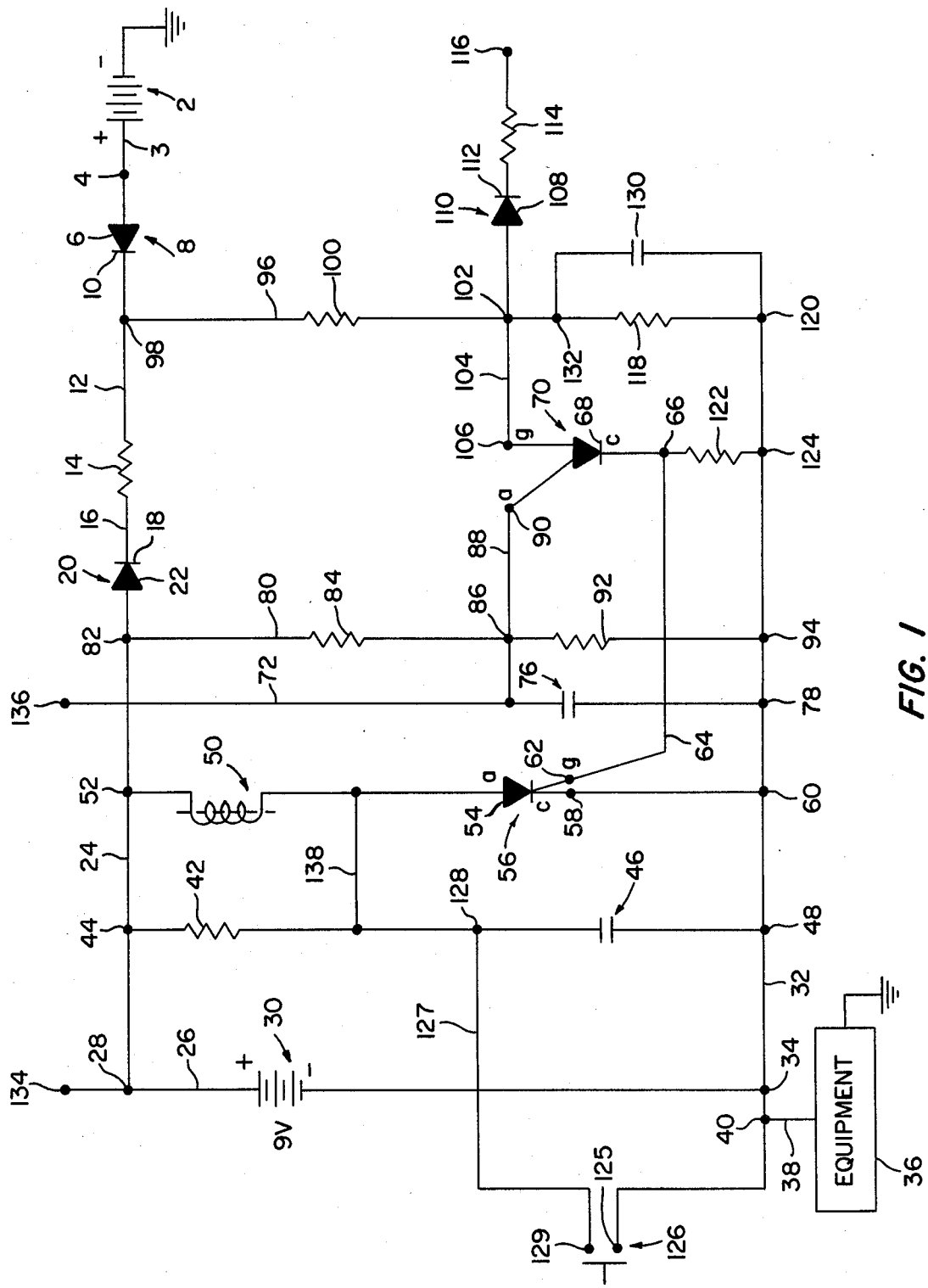
FIG. 1 is an electrical schematic diagram showing the basic embodiment of the invention.

With reference first to FIG. 1, a suitable voltage source designated by the numeral 2, which may be, for purposes of illustration, an automotive battery or the like, has a grounded negative terminal and a positive terminal connected through a conductor 3 to a circuit terminal 4 which is, in turn, connected to an anode 6 of a diode 8. Cathode 10 of diode 8 is connected through a conductor 12 to a resistor 14.

Resistor 14 is connected through a conductor 16 to a cathode 18 of a diode 20. Diode 20 has a anode 22 connected through a conductor 24 and through a conductor 26 joining conductor 24 at a circuit point 28 to the positive terminal of a suitable 9 volt d.c. source 30 which may be a conventional type battery such as used in transistor operated devices or the like. The negative terminal of battery 30 is connected to a conductor 32 at a circuit point 34.

The circuit shown in FIG. 1 is connected to equipment 36 through a conductor 38 joining conductor 32 at a circuit point 40. Equipment 36 may be portable equipment used in motor vehicles, boats, aircraft and other such vehicles which are powered by a suitably grounded voltage source 2.

A resistor 42 is connected to conductor 24 at a circuit point 44 and is connected to one plate of a capacitor 46. The other plate of capacitor 46 is connected to conductor 32 at a circuit point 48.

A load 50 is shown as including a coil having one leg connected to conductor 24 at a circuit point 52 and another leg connected to an anode (a) 54 of a silicon controlled rectifier 56. Silicon controlled rectifier 56 includes a cathode (c) 58 connected to conductor 32 at a circuit point 60 and a gate (g) 62 connected to a conductor 64. Conductor 64 is connected at a circuit point 66 to a cathode (c) 68 of a programmable unijunction transistor (PUT) 70.

A conductor 72 is connected to one plate of a capacitor 76 and the other plate of capacitor 76 is connected to conductor 32 at a circuit point 78.

A conductor 80 is connected to conductor 24 at a circuit point 82 and is connected to a resistor 84. Resistor 84 is connected at a circuit point 86 to a conductor 88. Conductor 88 is connected to an anode (a) 90 of PUT 70. A resistor 92 is connected to circuit point 86 and is connected to conductor 32 at a circuit point 94. Capacitor 76 is the energy storage capacitor for PUT anode (a) 90.

A conductor 96 is connected to conductor 12 at a circuit point 98 and is connected to a resistor 100. Resistor 100 is connected at a circuit point 102 to a conductor 104, which is connected to a gate (g) 106 of PUT 70, and is connected to an anode 108 of a diode 110. A cathode 112 of diode 110 is connected to a resistor 114 which leads to a circuit terminal 116. A resistor 118 is connected to circuit point 102 and is connected to conductor 32 at a circuit point 120. A resistor 122 is connected to circuit point 66 and is connected to conductor 32 at a circuit point 124.

Conductor 32 terminates at a terminal 125 and a conductor 127 leading from a circuit point 128 intermediate resistor 42 and a capacitor 46 terminates at a terminal 129. A normally open reset switch 126 is manually actuated to connect terminals 126 and 129 for being closed. Conductor 32 is connected to a capacitor 130 which is connected to a circuit point 132 intermediate resistor 118 and circuit point 102.

Circuit point 28 is connected to a circuit terminal 134 and conductor 72 is connected to a circuit terminal 136. A conductor 138 is connected intermediate resistor 42 and circuit point 128 and intermediate load 50 and anode 54 of silicon controlled rectifier 56.

With the circuit connections described as aforenoted, it will be understood that resistors 84 and 92 and resistors 100 and 118 form a pair of voltage dividers which supply proper voltage levels for rendering PUT 70 in an "off" condition. If battery 2 is removed or its connections are disturbed, as might be accomplished by an intruder, PUT 70 will be rendered "on" thereby firing silicon controlled rectifier 56 to actuate load 50 for sounding an alarm or the like (not shown) as is well known in the art. Capacitor 76 connected to the anode of PUT 70 ensures that a large current pulse is applied to gate element 62 of silicon controlled rectifier 56 upon the firing of PUT 70. Resistor 14 and battery 30 operate to provide a small voltage level to gate element 106 of PUT (70) during a fault condition. This small voltage level permits PUT 70 to supply a continuous chain of pulses to gate element 62 of silicon controlled rectifier 56. This continuous chain of pulses protects the circuit from being reset via switch 126 without repairing the power supply or ground fault that may have been disturbed as aforenoted.

Resistor 122 is the load resistor for cathode 68 of PUT 70 and also functions as the gate resistor for silicon controlled rectifier 56. Diode 8 protects the circuit from damage due to a polarity reversal when connecting battery 2 as may occur in automotive equipment or the like. Resistor 42 supplies minimum holding current to silicon controlled rectifier 56 as is required if load 50 has a vibratory switching action when activated. Capacitor 46 suppresses the spikes generated by the vibrating load and also aids normally open reset switch 126 in turning off the silicon controlled rectifier when the switch is closed.

Battery 30 supplies all standby current other than that provide by battery 2. Battery 30 also provides power to load 50 during a fault condition.

As seen from the configuration of FIG. 1, normally open reset switch 126 will cause load 50 to be activated when the switch is in the closed state. It will now be understood that this provides an effective means for testing voltage source 30 and load 50.

With the above description of the basic circuit of the invention as described with reference to FIG. 1 in mind, it will be understood that silicon controlled rectifier 56 will fire to actuate load 50 under a variety of circuit disturbing conditions as may be accomplished by an intruder. These conditions include disconnecting power lead 4 or the ground lead of battery 2, interrupting the connection of equipment 36 to ground or reset switch 126 being closed. Additionally, a self-test feature is provided which detects reverse installation of battery 2, the battery providing a voltage below a predetermined level as may be caused by poor battery cables or terminals, a low battery charge, a loose fan belt in automotive applications, or a variety of other conditions which may cause the battery to malfunction. Essentially, however, an alarm will be sounded upon battery 2 being disconnected or the ground connection of equipment 36 being interrupted as aforenoted, and which conditions are indicative that security has been broken. The alarm will continue to sound until all circuit fault conditions are removed and switch 126 is momentarily closed whereupon silicon controlled rectifier 56 is reset for detecting the next circuit fault.

With reference now to FIGS. 2 through 5, particular applications of the basic device shown in FIG. 1 will be described for purposes of illustrating the utility of the invention.

Figure 2:
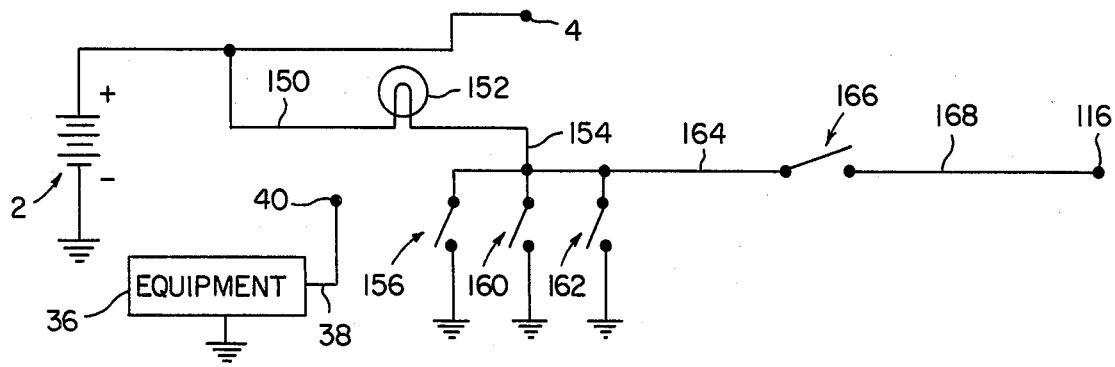
FIG. 2 is an electrical schematic diagram showing the invention of FIG. 1 particularly adapted for use with automobiles and similar type vehicles and wherein the invention operates in a sensorless mode.

With reference first to FIG. 2 a particular application of the security device of the invention is to protect against vehicle break-in and theft of equipment in the vehicle. The device described is applicable to most automotive vehicles on the market today. It will be understood that few people, when leaving a vehicle for only a few minutes, will take the time not only to lock the vehicle doors but set an alarm switch as well. The invention provides switching means to accommodate this situation. If the switching means is "on" the alarm will sound if the vehicle is entered. If the switching means is "off" and a protected piece of equipment is removed, the alarm will also sound.

Thus, the battery 2 is connected through a conductor 150 to an inside or dome light 152 of the vehicle and is connected to circuit terminal 4 as shown in FIG. 1. Light 152 is connected through a conductor 154 to a parallel arrangement of normally open grounded vehicle door switches, shown for illustration purposes as three in number and carrying the numerical designations 156, 160 and 162. The switches, in turn, are connected through a conductor 164 to a normally open exit/entry switch 166 which may be a key or toggle switch. The switch is connected through a conductor 168 to circuit terminal 116 shown in FIG. 1 a switch closure to ground at terminal 116 will reduce the reference voltage at circuit point 102 (FIG. 1) causing PUT 70 to be rendered "on".

In this connection it is noted that the device will operate only when battery 2 has its negative terminal connected to ground or switches 156, 160 and 162 complete their circuit to ground when the respective vehicle doors are opened.

In using the arrangement shown in FIG. 2, upon leaving the vehicle the operator locks the doors and actuates switch 166 to a closed position. Upon entering the vehicle, switch 166 is opened. This will disconnect door switches 156, 160 and 162 from terminal 116 (FIG. 2). In the arrangement shown, load 50 in the circuit configuration of FIG. 1 will be actuated to sound an alarm if switch 166 is closed and a door is opened, if switch 166 is left open and a piece of protected equipment 36 connected to circuit terminal 125 at circuit point 40 is removed or if either the positive or negative connections from battery 2 are removed or cut. It will be understood that the arrangement shown still operates in a sensorless mode if switch 166 is open. That is, no external sensors are required for actuating load 50 to indicate that equipment security has been broken.

Figure 3:
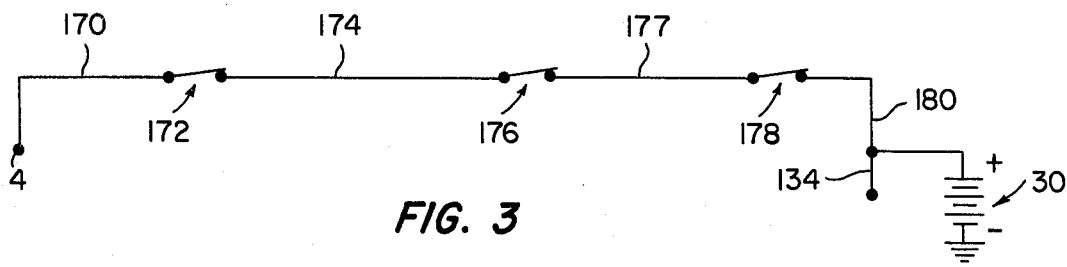
FIG. 3 is an electrical schematic diagram showing the invention of FIG. 1 adapted to operate in response to normally closed sensors.

As heretofore noted the circuit of the invention as shown basically in FIG. 1 may be operated in response to sensors without the inclusion of battery 2 and conductor 3 shown in FIG. 1. The embodiment of the invention shown in FIG. 3 illustrates an arrangement of normally closed sensors for this purpose.

Thus, a conductor 170 connected to circuit terminal 4 is connected to a normally closed sensor or switch 172. switch 172 is connected through a conductor 174 to a normally closed sensor or switch 176 and switch 176 is connected through a conductor 177 to a normally closed sensor or switch 178. Switch 178 is connected to a conductor 180 leading to the positive terminal of battery 30. The positive voltage from battery 30 places a reference voltage at the voltage divider including resistors 100 and 118 to render PUT 70 in its "off" state, providing switches 172, 176 and 178 are closed. Battery 30 is connected to circuit terminal 134 as also shown in FIG. 1.

Switches 172, 176, and 178, which are shown as three in number for illustrative purposes, may be of the magnetic type which open when mating magnets are displaced away from each other. For purposes of illustration, the switches will be described as associated with windows in a house and are normally closed when the windows are closed as will be understood by those skilled in the art. Upon opening one of the windows as by an intruder, the associated switch is opened which removes the reference voltage from the voltage divider and PUT 70 is rendered in its "on" state whereby load 50 sounds an alarm as heretofore described. It will now be understood with reference to FIGS. 1 and 3 that cutting of any of the switch connecting wires will likewise cause an alarm to be sounded.

Figure 4:
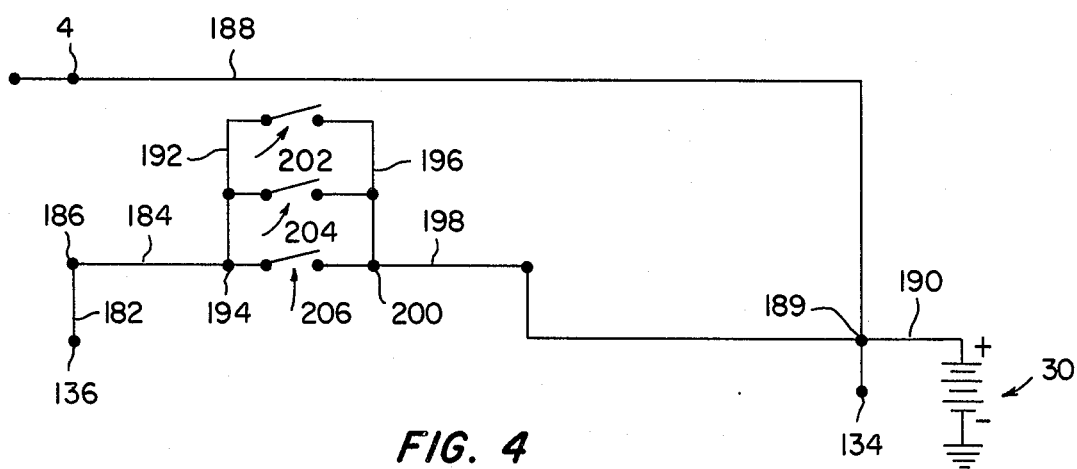
FIG. 4 is an electrical schematic diagram showing the invention of FIG. 1 adapted to operate in response to normally open sensors.

FIG. 4 shows an embodiment of the invention wherein a plurality of normally open sensors or switches are arranged in parallel. Thus, a concuctor 182 leads from circuit terminal 136 and joins a conductor 184 at a circuit point 186. When using normally open sensor only, a conductor 188 leads from circuit point 4 and is connected to a circuit point 189 which is connected through a conductor 190 to the positive terminal of battery 30. Conductor 188 supplies the reference voltage to voltage divider 100–118 to render PUT 70 in an "off" state. A conductor 192 is connected to conductor 184 at a circuit point 194 and a conductor 196 is connected to a conductor 198 at a circuit point 200. Conductor 198 is connected to circuit point 189 which, in turn, is connected to circuit point 134.

Magnetic switches or sensor such as described with reference to FIG. 3, shown for illustration purposes as three in number and designated by the numerals 202, 204 and 206, are connected in parallel between conductors 192 and 196. For purposes of illustration, switches 202, 204 and 206 may be included in pressure mats which support valuable household articles such as television sets, stereo sets, or the like. Upon removal of the article from its mat, the respective switch is closed from terminal 134 to terminal 136 and the anode voltage of PUT 70 is raised above the gate reference voltage and the PUT is rendered in its "on" state, and the circuit shown in FIG. 1 is activated whereby load 50 is actuated to sound an alarm as will now be understood by those skilled in the art.

Figure 5:
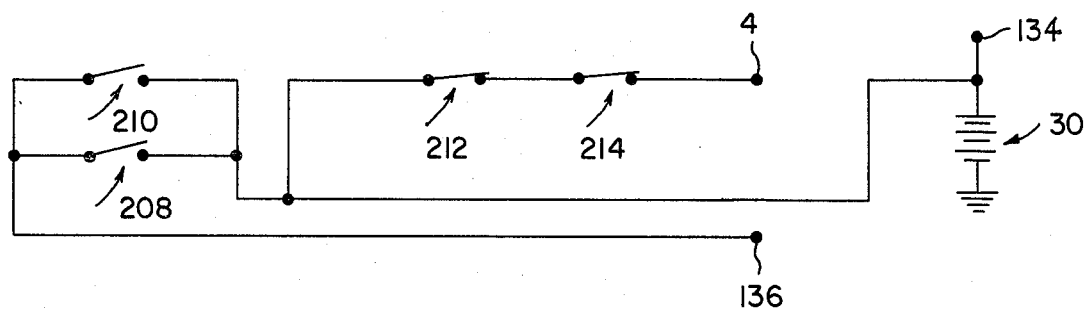
FIG. 5 is an electrical schematic diagram showing the invention of FIG. 1 adapted to operate in response to a combination of normally open and normally closed sensors.

FIG. 5 shows yet another embodiment of the invention utilizing normally open switches 208 and 210 and normally closed switches 212 and 214 as illustrated in the Figure. Switches 208 and 210 are connected in parallel while switches 212 and 214 are connected in series. The switches may likewise be, for illustrative purposes, of the pressure mat type whereby removal of an article supported by the pressure mat either closes the open switches or opens the closed switches, with either event actuating the circuit of FIG. 1 and thereby causing load 50 to be actuated for sounding an alarm as will also be understood by those skilled in the art.

It will now be understood that the basic circuit shown in FIG. 1 may be arranged with a varity of circuit configurations, either in sensor or sensorless modes as shown in FIGS. 2–5, to provide a security system which will satisfy the heretofore stated objects of the invention. The security system as provided is portable and self contained. With the variety of applications, of which only several have herein been described, the security system of the invention provides a versatility that has heretofore been unavailable. Thus, stationary equipment, mobile equipment, marine equipment and home or business entrances may be easily and economically protected. An important feature of the invention is that it is virtually tamper-proof and is thus highly effective for the purposes intended as will be seen from the aforegoing description of the invention with reference to the drawings.

Of further importance is the ease of testing battery 30 and load 50 which is accomplished by merely closing switch 126, and upon which event load 50 is actuated to sound an alarm. When the switch is open the circuit is reset and the alarm will stop. From the circuit diagram of FIG. 1 it will be seen that the circuit is protected against polarity reversal of battery 2, and installation is fool proof in this respect. Further, the device will operate even if the voltage from battery 2 drops from twelve volts to, for example, eight volts. Below eight volts the alarm will trigger, indicating a defective battery 2 or poor battery connections and maintainence is thus enhanced. With the battery and circuit connected as shown theft of the battery itself is precluded. Further, if an intruder finds reset switch 126, which may be overtly disposed, and cuts its connecting wires, the arrangement is such that the alarm is not disabled and will sound when a circuit disturbance occurs. Moreover, it will be readily seen that the described security device satisfies the criteria generally set forth in the aforenoted National Bureau of Standards brochure. Although several embodiments of the invention have been illustrated and described, various changes in the form and relative arrangement of the parts will appear obvious to those skilled in the art and may be made without departing from the spirit and scope of the invention.

What is claimed is:

1. A security system for protecting equipment and the like from intruders, comprising:

the equipment to be protected connected to ground;
a first voltage source;
circuit means having a connection to the first voltage source so as to be powered thereby and another connection to the grounded equipment so as to be grounded therethrough;
the circuit means including current flow control means normally in an "off" state and rendered in an "on" state when one of the circuit connections is disconnected upon an intrusion on the protected equipment;
alarm means connected to the current flow control means and affected by said means being in the "on" state for providing an alarm;
a second voltage source; d
sensor means connected to the second voltage source and to the circuit means, and arranged with the equipment so as to be actuated to render the current flow control means normally in the "off" state to the "on" state upon an intrusion on the equipment; and
the alarm means connected to the current flow control means affected by said means in the "on" state to provide an alarm;

2. A system as described by claim 1, including:
a first circuit terminal connected to the current flow control means;
a second circuit terminal connected to the circuit connection to the grounded equipment;
a switch for connecting the first and second circuit terminals; and
the current flow control means being rendered in the "off" state for resetting the system upon the one circuit connection being reconnected and the switch being manually operated to momentarily connect the first and second circuit terminals.

3. A system as described by claim 1, wherein:
a circuit means terminal is connected to the current flow control means;
the sensor means includes a plurality of sensors connected to the second voltage source and said circuit means terminal, and arranged with the equipment so as to be actuated to render the current flow control means normally in the "off" state to the "on" state upon an intrusion on the equipment; and
the alarm means connected to the current flow control means affected by said means in the "on" state to provide an alarm.

4. A system as described by claim 3, wherein:
the plurality of sensors connected to the second voltage source and to the circuit means terminal are connected in parallel.

5. A system as described by claim 1, including:
first and second circuit means terminals connected to the current flow control means;
the sensor means including a plurality of sensors connected to the second voltage source and to the first and second circuit means terminals, and arranged with the equipment so as to be actuated to render the current flow control means normally on the "off" state to the "on" state upon an intrusion on the equipment; and
the alarm means connected to the current flow control means and affected by said means in the "on" state to provide an alarm.

6. A system as described by claim 5, wherein:
the plurality of sensors connected to the second voltage source and to the first and second circuit means terminals are connected in parallel.

* * * * *